(12) United States Patent
Webb et al.

(10) Patent No.: US 9,001,207 B1
(45) Date of Patent: Apr. 7, 2015

(54) APPARATUS AND METHOD FOR MOTION DETECTION IN VIDEO

(75) Inventors: Todd Webb, Alpine, UT (US); Jeremy Noring, Corvallis, OR (US); Charles Coffing, Riverton, UT (US)

(73) Assignee: Logitech Europe S.A., Lausanne (CH)

( * ) Notice: Subject to any disclaimer, the term of this patent is extended or adjusted under 35 U.S.C. 154(b) by 441 days.

(21) Appl. No.: 13/325,834

(22) Filed: Dec. 14, 2011

Related U.S. Application Data

(60) Provisional application No. 61/423,072, filed on Dec. 14, 2010.

(51) Int. Cl.
*H04N 7/18* (2006.01)
*H04N 19/137* (2014.01)

(52) U.S. Cl.
CPC .................. *H04N 19/137* (2014.11)

(58) Field of Classification Search
CPC ..... H04N 5/144; G06T 7/20; G08B 13/19602
USPC .......................................... 348/155, 169, 143
See application file for complete search history.

(56) References Cited

U.S. PATENT DOCUMENTS

2010/0265344 A1* 10/2010 Velarde et al. ........... 348/208.16

* cited by examiner

*Primary Examiner* — Hung Dang
*Assistant Examiner* — Girumsew Wendmagegn
(74) *Attorney, Agent, or Firm* — Kilpatrick Townsend & Stockton LLP

(57) ABSTRACT

A motion detection method of a video camera includes calculating differences for a sum of accumulated differences (ΔSAD) for corresponding macro blocks in successive frames of video. The method may include identifying motion-generative macroblocks and regions of connected macroblocks. Candidate-motion regions may be defined in a frame and a bounding box may be formed around each of the candidate-motion regions. If corresponding bounding boxes in a plurality of successive frames have substantially the same location, size, and shape in the plurality of successive frames, and if the plurality of successive frames are in a temporal window of successive frames, then the corresponding bounding boxes may indicate motion.

12 Claims, No Drawings

APPARATUS AND METHOD FOR MOTION DETECTION IN VIDEO

The present application claims priority under 35 USC 119 (e) to U.S. Application Ser. No. 61/423,072, filed Dec. 14, 2010.

BACKGROUND OF THE INVENTION

The present invention generally relates to video cameras and video camera methods of operation. More specifically, embodiments of the present invention relate to a video camera and a motion detection method for detecting motion in video generated by the video camera.

Traditional video cameras have been configured to detect motion in video of observed scenes. For example, a video camera that provides surveillance of an observed scene may be configured to detect motion of objects in the video of the observed scene. A home owner, for example, operating the video camera is likely to be interested in knowing whether various objects are moving in a video of an observed scene. A home owner might be particularly interested whether a person, such as a burglar, is moving through the home owner's home while the home owner is at work or away on vacation and whether the home owner's video camera can detect the person's movement in the home. If the video camera detects motion, the video camera may be configured to begin recording video of the observed scene and might be configured to send a message to the home owner to direct the home owner to monitor the video collected by the video camera. For example, if the video camera is web enabled or is configured to send video to a web-enabled computer for access of the video via the web (e.g., the Internet), the home owner may be able to collect the video from the web while at work and observe the video. The home owner, via observation of the video, may determine whether further action needs to be taken based on the motion of objects observed in the video (e.g., whether an unexpected person is moving in the video).

Traditional video cameras typically have relatively limited processing power and therefore have limited capability for detecting motion. To simplify motion detection, traditional video cameras have been configured to execute motion detection methods using various video parameters that are generated during video encoding. For example, some traditional video cameras use the motion vectors and the value of the sum of accumulated differences (SAD), which are calculated during video encoding, to determine the motion of an object in an observed scene. These traditional video cameras may determine that motion of an object has occurred in a video, but may falsely report that motion of an object has occurred in a video. That is, traditional video cameras may determine that an object is in motion when no motion of the object actually occurred.

New video cameras and new video camera operation methods are needed for detecting motion of objects in video of an observed scene to reduce or eliminate the false determination of the motion of an object in an observed scene.

BRIEF SUMMARY OF THE INVENTION

The present invention generally relates to video cameras and video camera methods of operation. More specifically, embodiments of the present invention relate to a video camera and a motion detection method for detecting motion in video generated by the video camera.

According to one embodiment of the present invention, a motion detection method of a video camera includes calculating by the video camera differences for a sum of accumulated differences ($\Delta$SAD) for corresponding macroblocks in successive frames of video. For each of the macroblocks in each of the successive frames, the method further includes identifying by the video camera the macroblock as a motion-generative macroblock if the $\Delta$SAD for the macroblock is greater than the motion-threshold value, or if the $\Delta$SAD for the macroblock is greater than the flooding-threshold value and if the macroblock in a previous frame is in a region of connected macroblocks. The method further includes identifying by the video camera regions of connected macroblocks such that each of the regions of connected macroblocks contains at least one motion generative macroblock and contains macroblocks connected to the motion generative macroblock via a sequence of macroblocks and the macroblocks in the sequence of macroblocks each has a $\Delta$SAD value greater than the flooding threshold. The macroblocks in the sequence of macroblocks touch at at least one point. The regions of connected macroblocks in a frame define a candidate-motion region in a frame. The method further includes forming a bounding box around each of the candidate-motion regions. If corresponding bounding boxes in a plurality of successive frames have substantially the same location, size, and shape in the plurality of successive frames, and if the plurality of successive frames are in a temporal window of successive frames, then the method further includes determining that the corresponding bounding boxes indicates motion otherwise determining that the corresponding bounding boxes do not indicate motion.

According to a specific embodiment of the present invention, corresponding bounding boxes are determined to be corresponding by intersecting the bounding boxes in successive frames. According to another specific embodiment, each bounding box is stretched by a given fraction, such as one half.

According to another specific embodiment, each plurality of successive frames may include at least 5 successive frames in a temporal window of frames, and the temporal window of frames may include at least 14 successive frames.

According to another specific embodiment, the method further includes sending a communication to a user of the video camera if the corresponding bounding boxes in indicate motion, and may include recording video if the corresponding bounding boxes indicate motion.

A better understanding of the nature and advantages of the present invention may be gained with reference to the following detailed description and the accompanying drawings.

DETAILED DESCRIPTION OF THE INVENTION

The present invention generally provides a video camera and a video camera method of operation. More specifically, embodiments of the present invention provide a video camera and a motion detection method for detecting motion in video collected by the video camera.

Methods for detecting motion in video collected by a video camera is generally constrained by the available processing resources in the video camera. While, numerous methods exists for detecting motion in video by relatively more power personal computers, sufficient processing resources do not generally exist in video cameras to implement the existing methods for motion detection that are operable on personal computers.

To overcome the relatively limited processing power of the processing resources of video cameras, video camera operation methods have been developed that use video parameters generated during the processes of capturing and encoding video.

The video encoder of the video camera described herein generates two parameters that describe changes between video frames ("frames"). One of the parameters includes the motion vectors, and the other of the parameters includes the sum of accumulated differences (SAD). The motion vectors include coordinate component (e.g., the Cartesian coordinates x and y) that describe the movement of video content at each macroblock between successive frames. The SAD is a positive integer that provides a measure of the amount of change at each macroblock between successive frames. The motion vectors and the SAD are well known by those of skill in the art and will not be described in detail herein.

Traditional motion detection methods have used the SAD at each macroblock to determine motion. According to traditional motion detection methods, a threshold SAD, which is based on screen size was defined, such that a SAD for a macroblock that is greater than the threshold SAD was determined to indicate motion at the macroblock. The traditional motion detection method produced inconsistent results for two reasons. First, ideally any parameter that is to be used in a method for motion detection should ideally fall to near zero in frames or macroblocks where no motion of an object is present in a video. The SAD do not necessarily fall to zero if objects are not in motion in a video (e.g., if the observed scene is substantially static). Second, SAD are very susceptible to encoding noise. Relatively large SAD have been observed to exist for numerous types of static scenes.

According to one embodiment of the present invention, the H.264 encoding standard of encoding is followed by the video camera of the present invention. The H.264 standard is general provides for the avoidance of resending data in subsequent frames that has not changed. According to a further embodiment, a video camera uses a grid of 60×45 macroblocks. The method begins with the generation of an initial keyframe, which include an entire frame. Subsequent frames that follow the initial keyframe and that are before the next keyframe may include changes relative to the initial keyframe and relative to previous frames, which follow the initial keyframe.

High-Level Method Overview of Motion Detection Method

For convenience, a motion detection method of the present invention is described in a high-level overview and then is described in further detail below. According to one embodiment, the video camera is configured to execute a number of method steps to identify macroblocks in successive frames where the macroblocks include image information for an object that might be moving in the macroblocks. At a second set of method steps, the video camera is configured to filter out macroblocks identified in the first set of method steps that might be falsely identified as having image information for an object that likely not moving. According to one embodiment, in the first set of method steps the video camera is configured to calculate the differences between the SAD ($\Delta$SAD) for corresponding macroblocks for two successive frames. The $\Delta$SAD between corresponding macroblocks for two successive frames generally have properties that include:

$\Delta$SAD is relatively small between macroblocks in successive frames of a static scene;

$\Delta$SAD generally correlates with motion of an objects between macroblocks in successive frames where $\Delta$SAD rises on the leading edge of motion in a scene and falls on the trailing edge of motion in a scene; and theoretically $\Delta$SAD is an approximation of the first derivative of intensity, or stated alternatively is the rate of change of intensity in macroblocks of successive frames, where the rate of change of intensity between macroblocks of successive frames predicts motion of an object.

The inventors have determined that $\Delta$SAD is generally a predictor of motion of an objected in captured in successive frames and is generally a predictor of image changes that are not associated with "true" motion of an object in successive frames. For example, the inventors have determined that global image changes in successive frames that are caused by events, such as lighting changes or micro-motion caused by scene artifacts like tree flutter, may be interpreted as motion.

According to one embodiment, in the second set of method steps the video camera is configured to apply a temporal filter to filter out macroblocks having $\Delta$SAD that do not indicate true motion of an object between the macroblocks of successive frames. An object having "true" motion between the macroblocks of successive frames generally has a consistent representation (e.g., size and shape) across several successive frames. That is, an object having true motion generally does not change in size or shape between the macroblocks of successive frames.

Further Detailed Description of Motion Detection Method

According to one embodiment, in the first set of method steps the video camera is configured to identify candidate-motion regions in successive frames. A candidate-motion region is a set of connected macroblocks (e.g., connected at at least one point) were the connected macroblocks are identified as potentially indicating motion. Each candidate-motion region includes at least one "motion-generative macroblock." A motion-generate macroblock has a $\Delta$SAD greater than a motion-threshold value, or has a $\Delta$SAD greater than a flooding-threshold value and the macroblock was in a candidate-motion region of connected macroblocks in a previous frame. The motion-threshold value and the flooding-threshold value are first and second parameters of the $\Delta$SAD. The first parameter, the motion threshold, is a large positive value of $\Delta$SAD and indicates the leading edge of motion of an object in the macroblocks of successive frames. The second parameter, the flooding threshold, is a relatively smaller value of $\Delta$SAD and the absolute value of the flooding threshold indicates continuing motion of the object in the macroblocks of a frame or motion in a subsequent frame. For each frame, the video camera searches for macroblocks that are motion-generative macroblocks. More than one macroblock in a given frame may be identified as a motion-generative macroblock.

The video camera thereafter is configured to identify "regions of connected macroblocks" that are one or more candidate-motion regions. Each region of connected macroblocks contains at least one motion-generative macroblock (identified as described above) and has macroblocks that are connected to the motion-generative macroblock (via a sequence of macroblocks) where the macroblocks connected to the motion-generative macroblock has a $\Delta$SAD value greater than the flooding-threshold value. Each connected macroblock in the sequence macroblocks that form the regions of connected macroblocks touch at at least one point. The collection of all of the regions of connected macroblocks in a frame define the candidate-motion regions in a frame.

The general shape of a candidate-motion region may have a shape of an object that might be in motion in a successive number of frames. For example, if the video collected by the video camera is of a person walking in an observed scene, then the candidate-motion region may have the shape of the person. According to an alternative example, if the video collected by the video camera is of a car moving in an observed scene, then the shape of the candidate-motion region may have the shape of the car. If the video camera identifies more than one macroblock that passes the first or the second test, the video camera may be configured to generate more than one candidate-motion region. According to one embodiment, the video camera may represent each candidate-motion region by a two-dimensional bounding box ("bounding box") in macroblock space where each bounding box encloses all macroblocks in the bounding box's candidate-motion region.

According to one embodiment of the present invention, subsequent to the video camera generating the candidate-motion regions the temporal filter is applied to the candidate-motion regions by the video camera. The purpose of the application of the temporal filter is two fold. The first purpose of temporal filtering is to filter out false motion. False motion includes a candidate-motion region of successive frames that does not represent an object moving through the field of view of the video camera. The second purpose of the temporal filtering is to provide continuity of true motion of a candidate-motion region that does represent an object moving through the field of view of the camera.

The video camera is configured to create a sequence of candidate-motion regions in successive frames that approximates the motion of an object across the successive frames. The video camera is configured to apply a set of tests to the sequence of candidate-motion regions to determine whether the sequence of candidate-motion regions in the successive frames define the motion of a single object. The set of tests applied by the video camera includes: i) a toleranced, bounding-box, intersection test, ii) a consistent bounding box size and shape test, and iii) a consistent motion indicators test.

Toleranced, bounding-box, intersection test. It is noted that a set of successive frames that includes image information for a true object moving through the successive frames has substantially continuous motion through the successive frames. The video camera is configured to first test intersects of the bounding boxes for candidate-motion regions in the successive frames. In order to compensate for noise and inadequate sensitivity, the bounding boxes are stretched by a given amount (e.g., half of the width or height) prior to the intersection calculation.

Consistent bounding box size and shape test. A true object will not generally radically change its size or shape in successive frames. This is, the toleranced test attempts to distinguish successive motion of a single object from the motion of different objects or the motion of the combination of true motion and scene artifacts.

Consistent motion indicators test. True motion begins with a positive $\Delta SAD$ and ends with a negative $\Delta SAD$. The consistent motion indicators test is based on the foregoing described observation of the $\Delta SAD$.

The video camera is configured to label each sequence of candidate-motion regions as either indicating motion or not indicating motion by applying the following test to each of the sequences of candidate-motion regions test:

In order to indicate motion a sequence of candidate-motion regions must include frames from several frames (e.g., five or more frames) in a temporal-filter window. The temporal window is defined by a number of successive frames, where the number of successive frames may be about 13-16 frames, and according to one particular embodiment is 14 successive frames. The test for determining whether to indicate motion depends on two parameters: i) the temporal-window size (i.e., number of successive frames) and ii) a number of required frames, which is the number of frames (e.g., five or more frames) which must be present in a single sequence of candidate-motion regions within the temporal-filter window. Five frames of video correspond to about a third of a second.

After a sequence of candidate-motion regions has been identified by the video camera (by application of the foregoing described test) to indicate motion, the sequence of candidate-motion regions continues to indicate motion as long as the sequence of candidate-motion regions includes at least one candidate-motion region in at least one frame within the temporal-filter window. Thereby, the video camera is configured to identify regions of motion in each frame that have passed the temporal-filter test and truly contain image information for the motion of an object in the sequence of frames in the temporal-filter window. That is, sequences of candidate-motion regions that do not pass the foregoing described test applied by the video camera do not include image information for the motion of an object. The identification of these sequences of candidate-motion regions that do not pass the foregoing test are artifacts of the applied video camera method and are filtered out by the video camera.

According to one embodiment, the video camera is configured to receive a user input where the user input indicates an area of interest. An area of interest includes an area in an observed scene (which corresponds to a set of macroblocks in a frame) where a user would like the video camera to take one or more actions based on the identification of a sequence of candidate-motion regions as including image information for true movement and not a motion artifact. Areas outside of the area of interest provides that the video camera my receive information for excluding areas of motion that the user is not concerned about. For example, the video camera may receive area information for an area of interest that includes the area in front of the front door (for example which might be broken through by an intruder) to the user's house or includes the area in front of a window, which may be broken by an intruder to gain access to the user's home. Areas outside of the area of interest might include a tree or the like that a user understand may be initially identified by the video as a candidate-motion region, an area where the user has a flag flying on the user's home, a sidewalk where pedestrians walk, a street where cars drive by, etc. Those of skill in the art will appreciate that these specific area of interests and the areas outside of the areas of interest described immediately above are exemplary.

According to one embodiment, the areas of interest are maintained by the video camera as a bit vector in macro block space. The areas of motion are also maintained by the video camera as a bit vector in macro block space. A final step of the method may include the video camera calculating the intersection of the area of interest with the valid candidate-motion regions. If valid motion in a valid candidate-motion region in an area of interest is detected, then the video camera may: i) initiate the recording of the video generate by the video camera, and ii) have a message sent to the user so that the user can monitor the video generated by the video camera, iii) may have a message sent to a professional alarm company or a professional surveillance company so that the professional surveillance company might monitor the video generated by the video camera, iv) may have a message sent to police so that the police can monitor the video generated by the video camera, etc. It is noted that each of steps i)-iv) might not be executed in every embodiment. For example, according to one specific embodiment, steps i) and ii) are executed, but steps iii) and iv) are not executed. The video camera may be web enabled or may supply the video to a web enabled computer, and a user may access the video via the Internet on a computer, a mobile telephone, a tablet computer, a personal digital assistant, etc. Via receipt of the message and monitoring of the video generated by the video camera, a human user may be alerted to whether exigent circumstances exists in the area of interest monitored by the video camera.

It is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A motion detection method of a video camera comprising:
    calculating by the video camera differences for a sum of accumulated differences (ΔSAD) for corresponding macroblocks in successive frames of video;
    for each of the macroblocks in each of the successive frames, identifying by the video camera the macroblock as a motion-generative macroblock if the ΔSAD for the macroblock is greater than a motion-threshold value, or if the ΔSAD for the macroblock is greater than a flooding-threshold value and if the macroblock in a previous frame is in a region of connected macroblocks;
    identifying by the video camera regions of connected macroblocks such that each of the regions of connected macroblocks contains at least one motion generative macroblock and contains macroblocks connected to the motion generative macroblock via a sequence of macroblocks and the macroblocks in the sequence of macroblocks each has a ΔSAD value greater than the flooding threshold, wherein the macroblocks in the sequence of macroblocks touch at at least one point, and wherein the regions of connected macroblocks in a frame define a candidate-motion region in a frame;
    forming by the video camera a bounding box around each of the candidate-motion regions;
    if corresponding bounding boxes in a plurality of successive frames have substantially the same location, size, and shape in the plurality of successive frames, and if the plurality of successive frames are in a temporal window of successive frames, then determining by the video camera that the corresponding bounding boxes indicates motion otherwise determining that the corresponding bounding boxes do not indicate motion.

2. The motion detection method of claim 1, wherein corresponding bounding boxes are determined to be corresponding by intersecting the bounding boxes in successive frames.

3. The motion detection method of claim 1, further comprising stretching each bounding box by a given fraction of at least one of the bounding box width and height.

4. The motion detection method of claim 3, wherein the given fraction is one half.

5. The motion detection method of claim 1, wherein each plurality of successive frames includes at least 5 successive frames in a temporal window of frames.

6. The motion detection method of claim 5, wherein the temporal window of frames includes at least 14 successive frames.

7. The motion detection method of claim 1, further comprising sending by the video camera a communication to a user of the video camera if the corresponding bounding boxes in indicate motion.

8. The motion detection method of claim 1, further comprising recording by the video camera video if the corresponding bounding boxes indicate motion.

9. The motion detection method of claim 1, wherein the motion-threshold value is greater than the flooding-threshold value.

10. A motion detection method of a video camera comprising:
    setting a motion-threshold value, and a flooding-threshold value that is less than the motion-threshold value;
    calculating by the video camera differences for a sum of accumulated differences (ΔSAD) for corresponding macroblocks in successive frames of video;
    identifying by the video camera at least a first macroblock as a motion-generative macroblock based on the ΔSAD for the first macroblock being greater than the motion-threshold value;
    identifying by the video camera at least a second macroblock, that is connected to the first macroblock, based on the ΔSAD for the second macroblock being greater than the flooding-threshold value;
    identifying by the video camera a region of connected macroblocks including at least the first macroblock and the second macroblock;
    forming by the video camera a bounding box around the region of connected macroblocks;
    if the bounding box has substantially the same location, size, and shape as corresponding bounding boxes in a plurality of successive frames, and if the plurality of successive frames are in a temporal window of successive frames, then determining by the video camera that the corresponding bounding boxes indicate an area of motion, otherwise determining that the corresponding bounding boxes do not indicate an area of motion.

11. The motion detection method of claim 10, wherein identifying the region of connected macroblocks includes identifying a plurality of second macroblocks that are each connected directly to the first macroblock, or connected to the first macroblock via a sequence of second macroblocks, and the second macroblocks in the sequence of macroblocks each have a ΔSAD value greater than the flooding threshold.

12. The motion detection method of claim 10, further comprising:
    identifying an area of interest in the video camera's field of view; and
    if an area of motion intersects with the area of interest, at least one of initiating a recording by the video camera or sending a message from the video camera.

* * * * *